Patented Oct. 12, 1954

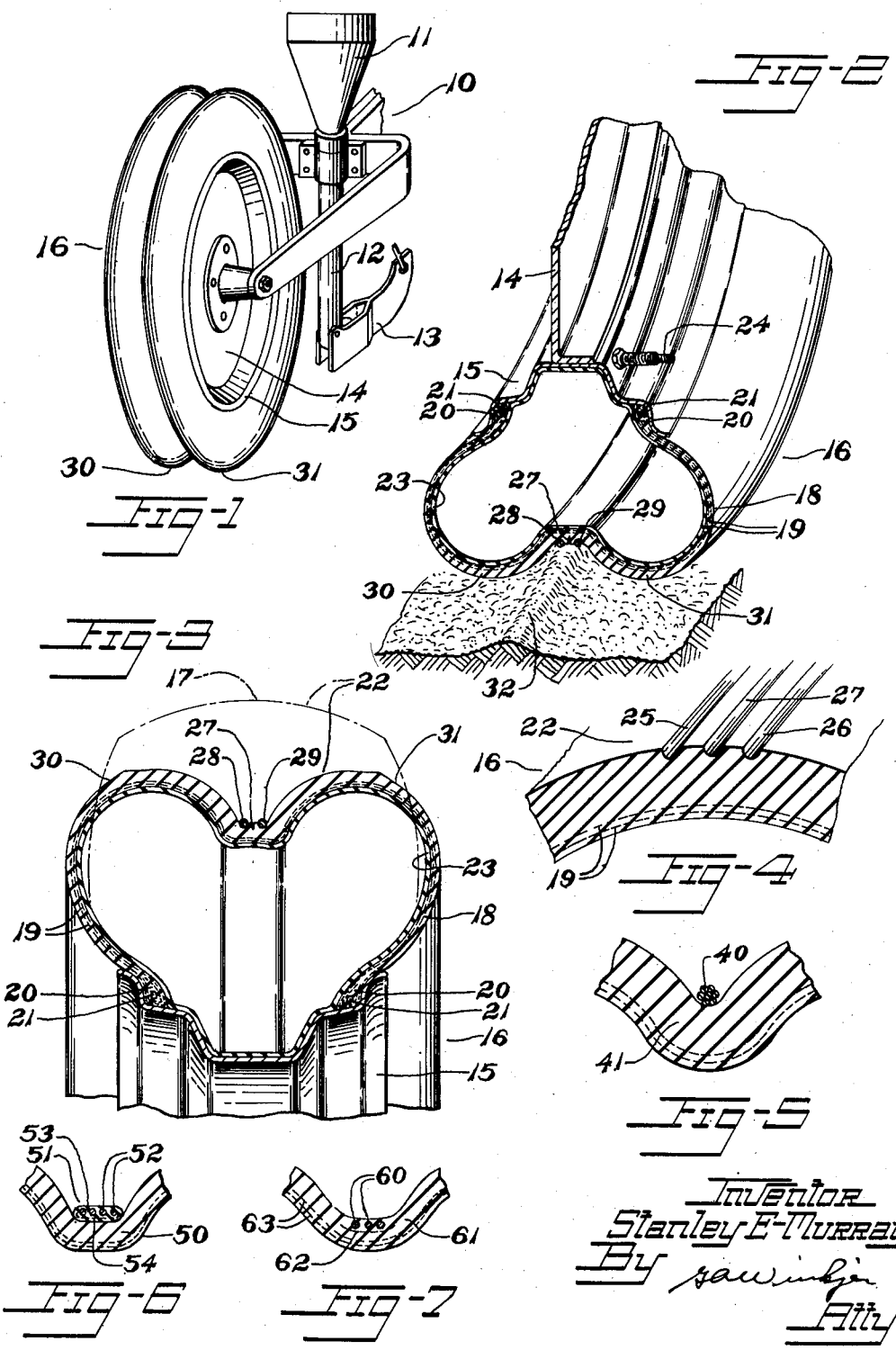

2,691,335

UNITED STATES PATENT OFFICE 2,691,335

PLANTER PRESS WHEEL TIRE

Stanley E. Murray, Chicago, Ill., assignor to The
B. F. Goodrich Company, New York, N. Y., a
corporation of New York Application August 9, 1949, Serial No. 109,350

3 Claims. (Cl. 97—56)

This invention relates to tires for the press wheels of planting equipment for row crops, such for example as corn, beans and beets.

Planters for this purpose utilizing steel press wheels for pressing the soil of the seeded row have had the objection that under some conditions the steel press wheels have picked up soil, thus defeating their proper functioning. Also the steel wheels have made it objectionable to transport the planter over highways.

The pneumatic tire offers advantages for press wheel applications inasmuch as the resilience of the tire wall provides a self-cleaning action to remove soil tending to cling to it, and the pneumatic tire makes it feasible to transport the planter over highways. However, when a pneumatic tire of conventional round cross section is used on the planter press wheel it has the objection that it presses directly down upon the seeded row, thus making a groove in the soil over the seed through which rain water can rush to injure the planting.

It is an object of the invention to provide a pneumatic press wheel tire that overcomes or avoids the foregoing and other difficulties. A further object is to provide a pneumatic tire so shaped as to accommodate the planted row and to present resilient surfaces of the tire adapted to press the soil at the sides of the planted row toward the center thereof. Further objects are to attain these ends by conversion of existing tires of round cross section, and to provide for simplicity of construction and convenience of manufacture.

These and further objects will be apparent from the following description, reference being had to the accompanying drawings in which:

Fig. 1 is a perspective view of a planter press wheel having a tire thereon constructed in accordance with and embodying the invention.

Fig. 2 is a cross-section of the mounted tire taken at the position of ground contact.

Fig. 3 is a view in cross-section of the mounted tire, the same tire before conversion thereof being outlined in broken lines.

Fig. 4 is a fragmentary section showing a manner of preparing the tread of the tire for conversion.

Figs. 5, 6 and 7 are fragmentary cross-sections of the central portion of the tread of the tire showing modified constructions.

The tire construction described herein is suitable for press wheels of various types of planting equipment, one type being illustrated in Fig. 1, wherein a planter 10, drawn as by a tractor, has a seed hopper 11 communicating with a feeding tube 12 by which the seed is dropped into a furrow in the soil made by a runner 13.

The embodiment of press wheel 14 illustrated in Figs. 1 to 4, inclusive, comprises a drop-center rim 15, upon which the improved tire 16 is mounted. Inasmuch as the improved tire may be made by conversion from a tire of conventional round shape, this tire will be described first with reference to its condition prior to the conversion. The tire is built, molded and vulcanized to the generally round cross-sectional shape shown by the broken line 17 in Fig. 3 and comprises a casing wall 18 of rubber material, which may be of natural or synthetic rubber, having embedded therein any suitable number of reinforcing plies 19, preferably of cord fabric. The reinforcing material 19 extends from the bead portions 20, 20 being anchored therein to beads 21, 21, around the wall of the casing including the crown portion 22 thereof. As shown in Fig. 3, the crown portion 22 is of a width exceeding the span of the bead portions 20, 21 and is at least as wide as the rim. It is connected to the bead portions by outwardly bowed side walls of reduced thickness adapted to flex readily under pressure of the soil at the crown portion. The casing is inflated by a single volume of inflating medium such as air acting upon all portions of the tire casing by means of an inner tube 23 within the casing and seated at its inner periphery upon the rim 15. A valve stem 24 extending through a rim opening and secured to the inner tube provides access at the exterior for the inflation.

The tire casing 18, molded and vulcanized to the shape 17, and thus suitable for conventional use as a round cross-section tire, is also suitable for conversion to the improved press wheel tire now to be described. Centrally of the crown portion one or more channels are provided in the tread face, as shown for example in Figs. 3 and 4. Three such channels 25, 26 and 27 may be provided, each extending about the entire circumference of the tire. The channels 25 and 26 supply seats for endless constricting rings 28, 29 of a diameter sufficiently less than the maximum diameter of the tire to hold the tire to a shape that is cordate in section as shown by the full lines in Fig. 3. The constricting rings 28, 29 are preferably of flexible material such as wire or cord, and may be coated with rubber or other protective material if desired. Upon such constriction the material in the crown of the tire is compressed and the tread channel 27 provides space to facilitate this compression without objectionable buckling of the tread material while the constricting rings are held out of contact with a plane surface contacting the crown portions laterally thereof.

This constriction of the crown provides a groove centrally of the tread for accommodating a planted row as the press wheel travels along the same and presents tread portions 30, 31 which diverge outwardly from the bottom of the groove and press the soil resiliently at the sides of the planted row toward the center thereof, which action advantageously serves to create a small ridge 32 of the soil over the planted seeds. This action is assisted by the resilient flexure of the inflated tire. As the inner tube 23 with its single volume of inflating medium fills the tire casing completely, the constricted tire may undergo considerable flexure in its action on the soil without causing the objectionable chafing of surfaces within the tire which would be likely if compartmentation were to be resorted to for maintaining the desired grooved shape of the tire.

The constricting rings 28, 29 may be selected of a large diameter such as to provide a groove in the tire of sufficient shallowness to press the soil downward at the bottom of the groove as well as inward at the sides thereof in case such pressing of the soil is desired. Or, the constricting rings may be selected of small diameters such that a tread groove is provided deep enough to avoid contact of the soil at the bottom of the groove, thus providing a side pressing action on the soil of the planted row without pressing down on the top thereof.

While the tread channels 25, 26 have the advantage of assisting to locate the constricting rings in a spaced-apart relation, and the central channel 27 has the advantage of accommodating compressive distortion of the tread material, these channels may be omitted if desired, the bulges of the inflated tire retaining the constricting element. Also, instead of a plurality of rings, a single constricting ring may be used at the outside face of the tread, if desired, which ring may be of solid wire or braided or cabled strands of wire or cord as indicated at 40 in Fig. 5, wherein the constricted crown portion of the tire is shown at 41. Alternatively, with reference to Fig. 6, the crown portion 50 of the tire may be held constricted by a band 51 made up of one or more wires or cords 52, 52, wrapped around in tape fashion, either directly upon the tire tread, or preliminarily into a ring for application to the tread. If desired, the wires 52, 52 may be embedded in a body 53 of rubber or other suitable material and may have a stress distributing reinforcement such as a piece of fabric 54 between the constricting element and the tire. The elements 52 and the fabric 54 may be embedded in the rubber 53 and vulcanized prior to assembly upon the tire.

The constructions hereinabove described are suitable for conversion of tires originally molded to round cross-sectional form. If desired, as illustrated in Fig. 7, the constricting means which may be one or more element or elements 60, 60 of any suitable material and form, may be built into the material of the crown of the tire 61 so as to be embedded in the crown portion thereof and the tire may be molded and vulcanized with the constraining element therein, so that the tire as molded and vulcanized is suitable for press wheel application without the operation of conversion above described. A reinforcement 62 of fabric may be embedded between the elements 60, 60 and the reinforcing plies 63 of the tire.

Variations may be made without departing from the scope of the invention as it is defined in the following claims.

I claim:

1. A seed-covering press-wheel for use in an agricultural seed planter and comprising a pneumatic soil-contacting tire on the rim of a wheel, the tire having a pair of annular, inextensible spaced bead portions seated on the rim of the wheel, and a thin-walled body portion of reinforced rubber material extending between the bead portions to define a continuous, annular hollow, inflatable chamber around the rim of the wheel, the body having a pair of spaced soil-contacting flexible tread portions at the radially-outermost portions of the body and being the portions of the body of maximum circumferential length, flexible outwardly-bowed sidewall portions connecting the bead portions with the tread portions and being yieldable outwardly under pressure of soil against said tread portions, between the tread portions at the periphery of the tire highly flexible, circumferentially-extending inwardly-converging resilient walls for laterally compacting soil between the tread portions, the inwardly-converging walls terminating at a circumferentially-extending portion radially inward from the tread portions and substantially midway between the tread portions and of appreciably shorter circumferential length than said tread portions for radially compacting soil between said tread portions, and the annular, hollow chamber defined by the body being inflated with a fluid medium at a pressure greater than atmospheric pressure which provides for substantial flexing of said sidewalls, said tread portions and said inwardly-converging walls in loose soil.

2. A seed-covering press-wheel for use in an agricultural seed planter and comprising a pneumatic soil-contacting tire on the rim of a wheel, the tire having a pair of annular, inextensible spaced bead portions seated on the rim of the wheel, and a thin-walled body portion of reinforced rubber material extending between the bead portions to define a continuous, annular, hollow, inflatable chamber around the rim of the wheel, the body having a pair of spaced soil-contacting flexible tread portions at the radially-outermost portions of the body and being the portions of the body of maximum circumferential length, flexible outwardly-bowed sidewall portions connecting the bead portions with the tread portions and being yieldable outwardly under pressure of soil against said tread portions, between the tread portions at the periphery of the tire highly flexible, circumferentially-extending inwardly-converging resilient walls for laterally compacting soil between the tread portions, the inwardly-converging walls terminating at a circumferentially-extending portion radially inward from the tread portions and substantially midway between the tread portions and of appreciably shorter circumferential length than said tread portions for radially compacting soil between said tread portions, and an annular inextensible member extending circumferentially about the body at said radially-inward portion for reinforcing and applying radially constricting pressure on said portion, and the annular, hollow chamber defined by the body being inflated with a fluid medium at a pressure greater than atmospheric pressure which provides for substantial flexing of said sidewalls, said tread portions and said inwardly-converging walls in loose soil.

3. A seed-covering press-wheel for use in an agricultural seed planter and comprising a pneumatic soil-contacting tire on the rim of a wheel, the tire having a pair of annular, inextensible spaced bead portions seated on the rim of the wheel, and a thin-walled body portion of reinforced rubber material extending between the bead portions to define a continuous, annular, hollow, inflatable chamber around the rim of the wheel, the body having a pair of spaced soil-contacting flexible tread portions at the radially-outermost portions of the body and being the portions of the body of maximum circumferential length, flexible outwardly-bowed sidewall portions connecting the bead portions with the tread portions and being yieldable outwardly under pressure of soil against said tread portions, between the tread portions at the periphery of the tire highly flexible, circumferentially-extending inwardly-converging resilient walls for laterally compacting soil between the tread portions, the inwardly-converging walls terminating at a circumferentially-extending portion radially inward from the tread portions and substantially midway between the tread portions and of appreciably shorter circumferential length than said tread portions for radially compacting soil between said tread portions, a continuous circumferential groove in the surface of said radially inward portion, an annular inextensible member seated in the groove for reinforcing and applying radially-constricting pressure on said portion, and the annular, hollow chamber defined by the body being inflated with a fluid medium at a pressure greater than atmospheric pressure which provides for substantial flexing of said sidewalls, said tread portions and said inwardly-converging walls in loose soil.

References Cited in the file of this patent

UNITED STATES PATENTS

| Number | Name | Date |
|---|---|---|
| 803,345 | Jeffery | Oct. 31, 1905 |
| 1,044,930 | Shaver | Nov. 19, 1912 |
| 1,293,528 | Palmer | Feb. 14, 1919 |
| 1,868,974 | Geraldson | July 26, 1932 |
| 1,922,291 | Hargraves | Aug. 15, 1933 |
| 2,249,637 | Rietz | July 15, 1941 |
| 2,601,464 | Tanke | June 24, 1952 |
| 2,606,486 | Klemm | Aug. 12, 1952 |

FOREIGN PATENTS

| Number | Country | Date |
|---|---|---|
| 18,284 | Great Britain | 1893 |
| 15,002 | Great Britain | 1896 |
| 9,168 | Australia | Sept. 12, 1933 |